United States Patent [19]

Haslett

[11] Patent Number: 4,747,853
[45] Date of Patent: May 31, 1988

[54] PRESSURE CONTROL

[75] Inventor: Andrew M. Haslett; John B.H. Johnson; both of Stockton-on-Tees Cleveland, England

[73] Assignee: Imperial Chemical Industries PLC, London, England

[21] Appl. No.: 64,568

[22] Filed: Jun. 22, 1987

[30] Foreign Application Priority Data

Jul. 2, 1986 [GB] United Kingdom ............... 8616185

[51] Int. Cl.⁴ ........................................... B01D 53/04
[52] U.S. Cl. ......................................... 55/21; 55/25; 55/163; 55/311; 55/314; 137/12
[58] Field of Search ................... 55/21, 25, 26, 58, 68, 55/74, 75, 161–163, 179, 311, 314, 387, 389; 137/12

[56] References Cited

U.S. PATENT DOCUMENTS

| | | | |
|---|---|---|---|
| 2,950,682 | 8/1960 | Kimmel | 137/12 |
| 3,399,510 | 9/1968 | Kauer, Jr. et al. | 55/58 X |
| 3,516,429 | 6/1970 | Sandstede et al. | 137/12 X |
| 3,646,727 | 3/1972 | Wachsmuth | 55/21 |
| 3,977,423 | 8/1976 | Clayton | 137/12 |
| 4,234,322 | 11/1980 | DeMeyer et al. | 55/21 X |
| 4,360,362 | 11/1982 | Asztalos | 55/21 |
| 4,375,363 | 3/1983 | Fuderer | 55/25 |
| 4,521,226 | 6/1985 | Aliq et al. | 55/21 |
| 4,545,790 | 10/1985 | Miller et al. | 55/179 X |
| 4,552,571 | 11/1985 | Dechene | 55/21 |

FOREIGN PATENT DOCUMENTS 157480 10/1985 European Pat. Off. .

Primary Examiner—Robert Spitzer
Attorney, Agent, or Firm—Cushman, Darby & Cushman

[57] ABSTRACT

A pressure control arrangement for a fluid line in a system, particularly a pressure swing adsorption system, wherein, in the event of a valve or control system malfunction, there is a risk of the fluid line being subject to an overpressure in an excess of its maximum design pressure, has a normally open valve, a flow restricting member, and a pressure sensor disposed in the fluid line. The pressure sensor is disposed upstream of the flow restricting member and arranged to sense the pressure in the line and to actuate the valve to close the line in the event of the sensed pressure exceeding a predetermined limit. The predetermined limit is above the normal operating pressure range of the fluid line but below the maximum overpressure to which there is a risk of the line being subject, and that portion of the fluid line upstream of the flow restricting member is constructed to have a maximum design pressure at least equal to the maximum overpressure.

9 Claims, 1 Drawing Sheet

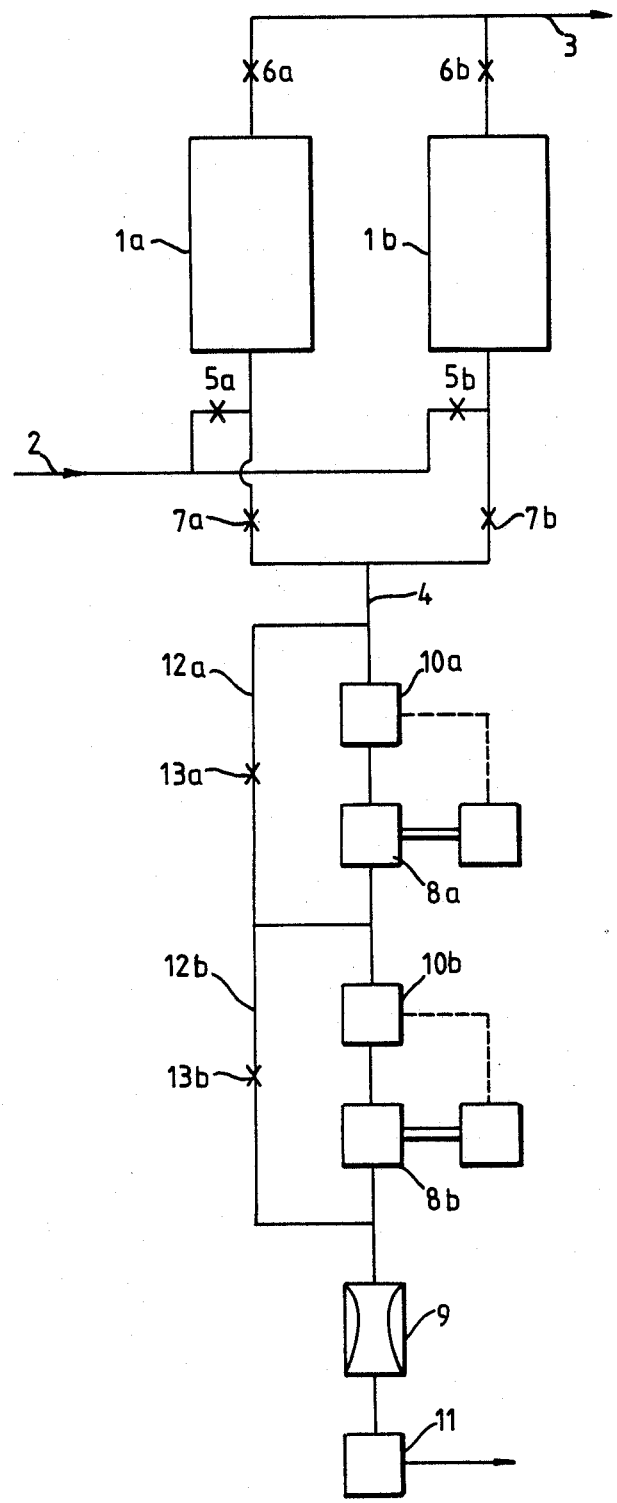

PRESSURE CONTROL

This invention relates to pressure control and in particular to the control of pressure in apparatus wherein there is a risk that the design pressure may accidentally be exceeded.

Vessels and pipelines for fluids are designed such that pressures in an excess of the maximum encountered during normal operation can safely be tolerated, up to a maximum design pressure. However for reasons of economy the maximum design pressure is desirably as low as possible. In many applications, relief valves can be incorporated to vent fluid to safety in the event of the fluid pressure exceeding the maximum design pressure. However problems in designing a suitable relief system are encountered where there is a risk of the maximum design pressure being exceeded by a considerable amount, particularly where the fluid flow rate is high, and/or where there is a relatively large amount of the high pressure fluid upstream of the desired relief system.

In particular problems are encountered where an inlet fluid stream is subjected to a process wherein a minor part stream is separated from the inlet stream and is provided at a pressure that is normally considerably below that of the inlet fluid stream and there is a risk of the inlet stream, or a higher pressure stream produced by separation of the lower pressure stream from the inlet stream, being inadvertently, e.g. through some equipment malfunction or operator error, connected to the lower pressure stream. An example of such a process is a pressure swing adsorption process wherein an inlet gas stream at relatively high pressure is separated, by adsorption, into a first gas stream at a relatively high pressure and a second gas stream at a relatively low pressure. Such processes are becoming increasingly adopted for gas separation, e.g. air separation, or gas purification processes. An example of the use of pressure swing adsorption for gas purification is described in EP-A-157480 where it is employed for the separation of carbon dioxide and other components from a raw gas to provide ammonia synthesis gas. In such pressure swing adsorption processes there is a risk that, as a result of valve or control system malfunction, the feed gas line may become connected to the low pressure second gas stream line. As a consequence the low pressure gas line would be subjected to the inlet feed pressure and so the maximum design pressure limit of the low pressure line is liable to become exceeded.

The present invention provides a method and apparatus for dealing with the above problems, particularly where, in normal operation, the low pressure mass flow rate is less than about half the feed mass flow rate.

Accordingly the present invention provides a pressure control arrangement for a fluid line in a system wherein, in the event of a valve or control system malfunction, there is a risk of the fluid line being subject to an overpressure in an excess of its maximum design pressure, comprising:

(a) valve means disposed in said fluid line, said valve means being in the open state during normal operation;
(b) flow restricting means disposed in said fluid line; that portion of the fluid line upstream of said flow restricting means being constructed to have a maximum design pressure at least equal to the maximum overpressure to which there is a risk of said line being subject; and
(c) pressure sensing means disposed upstream of the flow restricting means and arranged to sense the pressure in said line and to actuate said valve means to close said line in the event of the sensed pressure exceeding a predetermined limit, said predetermined limit being above the normal operating pressure range of the fluid line but below said maximum overpressure.

A conventional relief valve may be provided to relieve the fluid line downstream of the flow restricting means, and downstream of said valve means, of any excess of pressure, over the maximum design pressure of the fluid line downstream of the relief valve, resulting from any leakage of fluid past said valve means when the latter is in the closed position.

The degree of flow restriction provided by the flow restricting means, and the predetermined limit at which the valve means actuates, should be such, in relation to the time taken for the valve means to change from the open to the closed position, that, in the event of said fluid line being subject to the maximum overpressure, the maximum design pressure of the fluid line downstream of said flow restricting means is not exceeded.

The valve means is typically one or more rapid acting, e.g. spring operated, ball or spade valves. There are preferably two rapid acting valves, disposed in series, so that, in the event of one failing to operate, the other acts as a back-up. The use of two valves in series also has the advantage that one valve can be tested, as is periodically desirable, without stopping normal flow of fluid through the fluid line, while maintaining the pressure protection offered by the system. Thus, to enable such testing to be accomplished, each valve may be provided with a bypass, which is closed except during testing of that valve, so that the fluid flow can bypass the valve under test, while the other valve remains in operative condition in the fluid line.

The flow restricting means, which is preferably of a venturi construction, preferably exerts no appreciable flow restriction during normal operation: in this way little or no pressure drop in the fluid line occurs during normal operation. The flow restricting means may be upstream or, preferably, downstream of the valve means. The pressure sensing means is disposed upstream of the flow restricting means since this results in a more rapid response than if the pressure sensing means were to be downstream of the flow restricting means.

The present invention also provides a method of protecting a fluid line from overpressure in a system wherein, in the event of a valve or control system malfunction, there is a risk of the fluid line being subject to an overpressure in excess of its maximum design pressure, comprising automatically:

(a) monitoring the pressure in said line and actuating valve means to close said line in the event of the monitored pressure exceeding a predetermined limit, said predetermined limit being above the normal operating pressure range of the fluid line but below the maximum overpressure to which there is a risk of said line being subject; and
(b) in the event of the pressure in the line exceeding the normal operational range, restricting the flow of fluid in said line downstream of the position at which the pressure is monitored;

the degree of flow restriction, and the predetermined limit at which the valve means actuates, being such, in relation to the time taken for the valve means to change from the open to the closed position, that, in the event of said fluid line being subject to the maximum overpressure, the maximum design pressure of the fluid line downstream of said flow restricting means is not exceeded.

In accordance with a preferred form of the invention there is provided a pressure swing adsorption system wherein an inlet gas stream is separated by adsorption into a first gas stream at a first pressure and a second gas stream at a second pressure that is lower than said first pressure, and the fluid line for said second gas stream is provided with a pressure control arrangement comprising:

(a) valve means disposed in said fluid line, said valve means being in the open state during normal operation;
(b) flow restricting means disposed in said fluid line, that portion of the fluid line upstream of said flow restricting means being constructed to have a maximum design pressure at least equal to the first pressure; and
(c) pressure sensing means disposed upstream of the flow restricting means and arranged to sense the pressure in said line and to actuate said valve means to close said line in the event of the sensed pressure exceeding a predetermined limit, said predetermined limit being above the normal operating pressure range of the fluid line but below said first pressure.

The present invention is of particular utility in an ammonia plant having a pressure swing adsorption system to separate raw gas produced in previous reforming and shift stages into an ammonia synthesis gas product (which may be methanated prior to use for ammonia synthesis) and a waste gas.

One embodiment of the invention is illustrated by reference to the accompanying drawing.

In the drawing there is shown diagramatically a pressure swing adsorption (PSA) system for the production of ammonia synthesis gas by separation of impurities from a raw gas. The PSA system comprises a plurality of adsorber vessels 1 (only two, 1a, 1b are shown; in practice there will usually be at least four, and in some cases up to ten or even more) to which the raw gas at a high pressure, typically in the range 20 to 50 bar abs., is supplied via a feed line 2. Unadsorbed product gas, i.e. the desired ammonia synthesis gas, generally at a pressure not substantially below the pressure of the raw gas in line 2, is taken from the adsorber vessels 1 via line 3. The separated impurity-containing gas is taken from the adsorbers 1, in a counter-current depressurisation stage of the PSA cycle, via a waste gas line 4. Usually the pressure in waste gas line 4 is much lower than that in the raw gas feed line 2 and the product gas line 3. Typically the pressure in the waste gas line 4 is below 10 bar abs. and often is no greater than 4 bar abs.

The flow of gas to and from the adsorbers 1 is determined by a series of valves 5, 6, 7 in the raw gas feed line 2, the product gas line 3, and the waste gas line 4 respectively. Also further valves and lines (not shown) will normally be provided to permit equalisation, repressurisation, and, usually, purge and/or co-current depressurisation, and possibly sweep, stages to be included in the PSA cycle. The sequencing of the various valves to effect the desired PSA cycle is typically computer or microprocessor controlled. In normal operation valve 7a will be closed while valve 5a is open, and vice-versa. Likewise valve 7b will be closed while valve 5b is open and vice-versa. However should a malfunction occur, e.g. as a result of one or more valves sticking and/or a fault in the sequencing control arrangement, there is a risk that the waste gas line 4 is inadvertently connected to the raw gas line, directly, e.g. if both valves 5a and 7a become open simultaneously, or indirectly, e.g. if, while valves 5a, 6a and 7b are open, valve 6b opens. In this event the waste gas line 4 will be subject to the pressure of the raw gas line 2, i.e. well above its normal working pressure range. In order that all of the waste gas line 4 does not have to be constructed to withstand the possible high pressure of the raw gas line 2, a pressure control system is required.

While in some applications a simple relief valve can be incorporated in the waste gas line 4, this is not a practical proposition in cases, such as the above mentioned application, where there is a large mass of high pressure gas upstream of the raw gas inlet and the mass flow rates are high.

For example, in a process according to EP-A-157480, for an ammonia plant producing about 1100 te/day of ammonia, the raw gas flow rate is typically about 8900 kg mol/hr and is at a pressure of about 35 bar abs., the product gas flow rate is typically about 5900 kg mol/hr at pressure only about 0.3 bar below that of the raw gas and the waste gas flow rate is typically about 3000 kg mol/hr at a pressure of about 1.5 bar abs. In such a process it would be realistic to provide a maximum design pressure of no more than about 10 bar abs. for the waste gas line 4. Because of the large volume of the plant upstream of the PSA system, e.g. in the reforming and shift stages producing the raw gas, conventional relief valve arrangements would not be able to handle the mass of gas involved, if the raw gas line were to be connected to the waste gas line, without that maximum design pressure being exceeded by a considerable amount.

In accordance with the present invention, in order to provide the necessary pressure protection for the waste gas line 4 in the above embodiment, two rapid acting ball valves 8 and a venturi flow restrictor 9 are provided in series in the waste gas line 4 downstream of valves 7. The actuators for valves 8 cause the valves 8 to close when the pressure sensed by pressure sensors 10 upstream of the flow restrictor 9 reaches a predetermined limit. For a high integrity system, each valve 8 may have more than one sensor 10 and actuates when the pressure sensed by any one or more of the sensors reaches the predetermined limit. Each valve 8a, 8b has its own pressure sensor, or set of sensors, 10a, 10b and actuator although in some arrangements only one sensor, or set of sensors, may be necessary. In the drawing the pressure sensor is shown upstream of its respective valve but it will be appreciated that the sensor, or sensors, can be in any position upstream of the flow restrictor 9. Also, in the drawing, the valves 8 are shown to be upstream of the flow restrictor 9: again it will be appreciated that this is not essential. Downstream of the flow restrictor 9 is a conventional relief valve 11 which opens when the pressure reaches a pressure determined by the maximum design pressure of the waste gas line downstream of valve 11. The waste gas line upstream of the flow restrictor 9 is constructed to withstand a maximum pressure equal to, or greater than, the maximum pressure that is liable to be encountered in the raw gas feed line 2.

During normal operation, valves 8a, 8b, and 11 are open, allowing fluid to flow through the waste gas line 4. In the event of one or both of the pressure sensors 10 sensing a pressure above the predetermined limit, the respective valve 8 actuates to close the waste gas line 4. Since valves that permit the required mass throughput at the normal waste gas pressure during normal operation without causing appreciable pressure drop are of a relatively large bore, even if the valves are of the rapid acting type, there is a considerable time delay between the sensor 10 sensing a pressure above the predetermined level and the valve 8 being fully closed. For example rapid acting spring loaded valves capable of allowing a gas flow of 3000 kg mol/hr at 1.5 bar abs. without appreciable pressure drop, typically have a time delay of about 3 sec between the actuating pressure being sensed and the valve being fully closed.

During normal operation the venturi flow restrictor 9 effects little flow restriction and so little pressure drop across the venturi restrictor occurs. However, in the event of the raw gas line 2 becoming connected to the waste gas line 4, the venturi flow restrictor exerts a considerable throttling effect thus limiting the rate at which gas can flow through the venturi restrictor 9 and so limiting the rate at which the pressure downstream of the restrictor 9 rises.

The predetermined pressure level at which the sensors 10 cause actuation of the valves 8 is set to be sufficiently above the normal operating waste gas pressure to prevent spurious actuation of the valves 8 but below the maximum pressure that the waste gas line 4 is liable to be subject in the event of a malfunction causing the raw gas line 2 to be connected to the waste gas line 4. This predetermined pressure level is set such that, in relation to the closing time of valves 8 and the throttling effect of the flow restrictor 9, the valves 8 fully close before the maximum design pressure of the waste gas line downstream of flow restrictor 9 is exceeded. Typically, for the above system normally handling about 3000 kg mol/hr of gas at 1.5 bar abs., but subject to the risk of gas at 35 bar abs. being supplied thereto, with valves 8 having a closing time of 3 sec, the waste gas line 4 has an internal diameter of about 60 cm, the venturi flow restrictor 9 has a minimum internal diameter of about 30 cm and the predetermined pressure at which the sensors 10 actuate valves 8 is about 3 bar abs. By such an arrangement, the pressure downstream of venturi 9 will not exceed about 10 bar abs. in the event of the raw gas line 2 becoming connected to the waste gas line.

The relief valve 11 actuates when the sensed pressure reaches a level that is above the normal operating pressure range of the waste gas line 4 but below the maximum design pressure of the waste gas line downstream of relief valve 11. Relief valve 11 should be arranged to operate at a pressure not exceeding the pressure that might occur downstream of the flow restrictor 9 as a result of leakage of gas past valves 8 when the latter are closed and the raw gas line 2 is connected to the waste gas line 4.

Each of valves 8 is provided with a bypass line 12, fitted with a normally closed valve 13, to enable valves 8 to be tested without interruption of normal operation of the PSA system and yet still the pressure protection offered by the invention is maintained. Thus, when it is desired to test valve 8a, valve 13a is opened, thereby bypassing valve 8a, but leaving valve 8b in the waste gas line 4 to operate in the aforementioned manner in the event of the waste gas line becoming subject to overpressure.

It is seen that in the present invention, in the event of the waste gas line 4 becoming subject to overpressure, the waste gas line 4 is effectively closed, thus protecting apparatus downstream of the flow restrictor 9. Provision may be made, if desired, for venting the high pressure gas bottled up in the waste gas line 4 in a controlled manner.

We claim:

1. A pressure control arrangement for a fluid line in a system wherein, in the event of a valve or control system malfunction, there is a risk of the fluid line being subject to an overpressure in an excess of its maximum design pressure, comprising:
   (a) valve means disposed in said fluid line, said valve means being in the open state during normal operation;
   (b) flow restricting means disposed in said fluid line, that portion of the fluid line upstream of said flow restricting means being constructed to have a maximum design pressure at least equal to the maximum overpressure to which there is a risk of said line being subject; and
   (c) pressure sensing means disposed upstream of the flow restricting means and arranged to sense the pressure in said line and to actuate said valve means to close said line in the event of the sensed pressure exceeding a predetermined limit,
   said predetermined limit being above the normal operating pressure range of the fluid line but below said maximum overpressure.

2. A pressure control arrangement according to claim 1 wherein the flow restricting means comprises a venturi.

3. A pressure control arrangement according to claim 1 wherein the flow restricting means is downstream of the valve means.

4. A pressure control arrangement according to claim 1 wherein a pressure relief valve is provided downstream of the flow restricting means and downstream of said valve means.

5. A pressure control arrangement according to claim 1 wherein the valve means comprises two rapid acting valves in series.

6. A pressure control arrangement according to claim 5 wherein normally closed bypass means are provided for each valve, whereby each valve can be tested, while the other remains in operative condition, by opening the bypass for the valve to be tested.

7. A method of protecting a fluid line from overpressure in a system wherein, in the event of a valve or control system malfunction, there is a risk of the fluid line being subject to an overpressure in excess of its maximum design pressure, comprising automatically:
   (a) monitoring the pressure in said line and actuating valve means to close said line in the event of the monitored pressure exceeding a predetermined limit,
   said predetermined limit being above the normal operating pressure range of the fluid line but below the maximum overpressure to which there is a risk of said line being subject; and
   (b) in the event of the pressure in the line exceeding the normal operational range, restricting the flow of fluid in said line downstream of the position at which the pressure is monitored,
   the degree of flow restriction, and the predetermined limit at which the valve means actuates, being such, in relation to the time taken for the valve means to change from the open to the closed position, that, in the event of said fluid line being subject to the maximum overpressure, the maximum design pressure of the fluid line downstream of said flow restricting means is not exceeded.

8. A pressure swing adsorption system wherein an inlet gas stream is separated by adsorption into a first gas stream at a first pressure and a second gas stream at a second pressure that is lower than said first pressure, and the fluid line for said second gas stream is provided with a pressure control arrangement comprising:

(a) valve means disposed in said fluid line, said valve means being in the open state during normal operation;

(b) flow restricting means disposed in said fluid line, that portion of the fluid line upstream of said flow restricting means being constructed to have a maximum design pressure at least equal to the first pressure; and (c) pressure sensing means disposed upstream of the flow restricting means and arranged to sense the pressure in said line and to actuate said valve means to close said line in the event of the sensed pressure exceeding a predetermined limit, said predetermined limit being above the normal operating pressure range of the fluid line but below said first pressure.

9. An ammonia plant incorporating reforming and shift stages and having a pressure swing adsorption system to separate raw gas produced in said reforming and shift stages into a product gas and a waste gas wherein the pressure swing adsorption system is in accordance with claim 8.

* * * * *